United States Patent
Eimers

[15] 3,697,623
[45] Oct. 10, 1972

[54] N-ARYL-SUBSTITUTED DIALKANOLAMINO POLYURETHANES

[72] Inventor: Erich Eimers, Krefeld, Germany

[73] Assignee: Farbenfabriken Bayer Aktiengesellschaft, Leverkusen, Germany

[22] Filed: Sept. 25, 1970

[21] Appl. No.: 75,715

Related U.S. Application Data

[62] Division of Ser. No. 735,511, June 10, 1968, abandoned.

[30] Foreign Application Priority Data

July 4, 1967  Germany..................F 52853

[52] U.S. Cl.......260/859 R, 260/75 NH, 260/75 TN, 260/77.5 AA, 260/77.5 AM, 260/77.5 AP, 260/77.5 MA
[51] Int. Cl. ............................................C08g 41/04
[58] Field of Search........260/859, 77.5 AP, 77.5 AA

[56] References Cited

UNITED STATES PATENTS 3,061,470  10/1962  Kuemmerer............117/138.8
3,143,517  8/1964  Heiss.........................260/18

FOREIGN PATENTS OR APPLICATIONS 994,297  6/1965  Great Britain.............260/859

OTHER PUBLICATIONS

Flory– Principles of Polymer Chemistry, Cornell University, Ithaca, N.Y. (1953) pages 40– 41, 45– 46 QD 281 P6F66

Lenz– Organic Chemistry of Synthetic High Polymers, Interscience, New York, (1967) pages 3, 4, 11, 12, 53– 56, 186– 189. QD 281 P6L4

*Primary Examiner*—Paul Lieberman
*Attorney*—Connolly and Hutz

[57] ABSTRACT

Molding compositions may be prepared from a solution of an unsaturated polyester prepared from an ethylenically unsaturated dicarboxylic acid and diol, in a copolymerizable monomer exemplified by styrene, vinyl toluene and alkyl acrylates. The solution also contains 0.1 to 5.0 percent weight of an N-aryl-substituted diaklanolamino polyurethane prepared from the reaction product of an N-aryl substituted dialkanolamine, a diisocyanate, and one of a monoisocyanate, a monothioalcohol, or monoamine.

5 Claims, No Drawings

N-ARYL-SUBSTITUTED DIALKANOLAMINO POLYURETHANES

CROSS REFERENCE TO RELATED APPLICATION

This application is a division of application Ser. No. 735,511 filed June 10, 1968 and now abandoned.

The object of the invention comprises N-aryl-substituted dialkanolamino-polyurethanes containing alkyl or aryl terminal groups and corresponding to the general formula

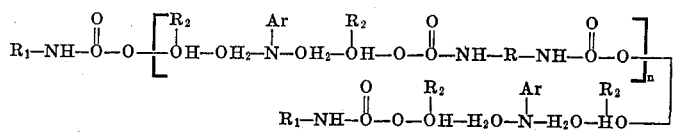

or

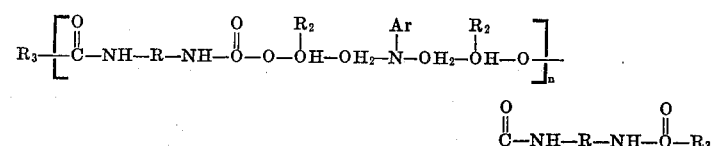

in which Ar denotes aryl, R is alkylene or arylene, $R_1$ is alkyl or aryl, $R_2$ is H or $-CH_3$, $R_3$ is $-O-R_4$ or

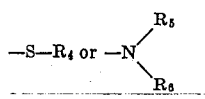

, $R_4$ is alkyl, preferably

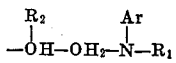

$R_5$ is H or alkyl or aryl, $R_6$ is alkyl or aryl, $n$ is 1 to about 10, preferably 1 to about 5,
a process for their production and for their use as additives to intermediates of polyester moulding materials.

At room temperature, the dialkanolamino-polyurethanes are crystallized or highly viscous to solid resinous materials.

The process for their production consists in that a N-aryl-substituted dialkanolamine of the formula

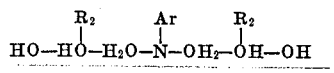

is reacted with a diisocyanate of the formula

and a monoisocyanate of the formula

or with a monoalcohol, a monothioalcohol or a primary or secondary amine of the formula

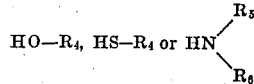

in the molar ratio of 2:1:2 to about 11:10:2, preferably to about 6:5:2, or 1:2:2 to about 10:11:2, preferably to about 5:6:2, at temperatures of about 50° to about 150° C, preferably about 80° to about 120° C, in the presence or absence of solvents.

A preferred method of carrying out the process consists in reacting the dialkanolamine and the diisocyanate in a molar ratio of 2:1 to about 11:1, preferably to about 6:5, or of 1:2 to about 10:1, preferably to about 5:6, and to react the monourethane or monoalcohol or monothioalcohol or amine in the stated molar ratio on the reaction product.

Suitable dialkanolamines of the said type are, for example, N-di(P-hydroxyethyl)- or -(p-hydroxypropyl)- aniline, -p-chloroaniline, -pentachloroaniline, -p-toluidine, -diphenylamine and -p-naphthylamine.

Examples of suitable diisocyanates are tetramethylene and hexamethylene diisocyanate, p-phenylene diisocyanate, toluylene diisocyanate p,p'-diphenylene diisocyanate, and 1,3,5-triisopropyl-phenylene diisocyanate-2,6.

Monoisocyanates which can be used are, for example, ethyl, propyl, butyl, allyl and methoxymethyl isocyanate, phenyl isocyanate, pentachlorophenyl isocyanate and naphthyl isocyanate.

Suitable monoalcohols and thioalcohols are, for example, ethanol, propanol, butanol and isobutanol and the corresponding thioalcohols as well as β-hydroxypropyl methacrylate, but preferably N-methyl- and N-ethyl-N-β- hydroxyethyl and -N-β-hydroxypropylaniline and -p-toluidine.

Suitable primary amines are, for example, ethylamine, n-butylamine, cyclohexylamine, aniline, toluidine, α-naphthylamine and β-naphthylamine.

Examples of suitable secondary amines are diethyl-, dipropyl-, dibutyl-, diamyl-, diphenyl-, di-p-toluyl- and di-β-naphthylamine as well as mixed amines, such as methylethyl-, ethylpropyl-, ethylbutyl-, ethylphenyl-, ethyl-p-toluyl- and ethylnaphthyl-amine, morpholine and piperidine.

Examples of solvents which may be concurrently used for the preparation of the polyurethanes are dioxan, ethyl acetate, butyl acetate, toluene, o,m,p-xylene and dibutyl ether. These solvents are distilled off when the reaction is completed.

However, those solvents are preferred which contain polymerizable vinyl groups, as these not be removed; they can be added together with the polyurethanes dissolved in them to the moulding material intermediates, since they are copolymerized in the course of the subsequent hardening of the intermediates with the hardening products. Solvents of this type are, for example, vinyl acetate, allyl acetate, phthalic acid diallyl ester, 1,1,1-trimethylol-propane triallyl ether, ethyl acrylate, methyl methacrylate, styrene and vinyltoluene.

The preparation of the new polyurethanes may be illustrated by the following Examples 1 to 3,

EXAMPLE 1

(molar ratio 2:1:2)

195 Parts by weight N-di-($\beta$-hydroxyethyl)-p-toluidine (1 mole) are melted in a stirring vessel with the exclusion of moisture and heated to 110° C. 84 Parts by weight hexamethylene diisocyanate (0.5 mole) are then added in the course of 1 hour. The reaction mixture is stirred at the same temperature for a further hour. 110 Parts by weight phenyl isocyanate (1 mole) are then added at 110°– 120° C in the course of a further 1½ hours. After further stirring at 115° C for 1 hour, 0.5 parts by weight hydroquinone are added. A yellow-colored resin is obtained.

EXAMPLE 2

(molar ratio 3:2:2)

292.5 Parts by weight N-di-(p-hydroxyethyl)-p-toluidine (1.5 mole), 168 parts by weight hexamethylene diisocyanate (1mole) and 110 parts by weight phenyl isocyanate (1 mole) are reacted as described in Example 1. The resinous polyurethane is stabilized by the addition of 0.82 parts by weight hydroquinone.

EXAMPLE 3

(molar ratio 3:4:2)

260 Parts by weight N-di-(p-hydroxyethyl)-p-toluidine (1.33 mole) are reacted, as described in Example 1, with 299 parts by weight hexamethylene diisocyanate (1.78 mole). 135 Parts by weight N-methyl-N-(p-hydroxyethyl)-aniline are then added at 120° C in the course of ½ hour. After further stirring at 120° C for 1 hour, the resinous polyurethane is stabilized by the addition of 0.875 parts by weight hydroquinone.

The new polyurethanes are particularly suitable as additives to intermediates of polyester moulding materials, i.e. to solutions of unsaturated polyesters in copolymerizable monomers which are converted, after the further addition of an organic peroxide, mainly a diacyl peroxide, into cold-hardening moulding materials. Added amounts of the polyurethanes of about 0.1 to about 5 percent by weight, referred to the intermediate of the polyester moulding material will be sufficient for the said purpose.

The new polyurethanes are characterized by their good compatibility with these intermediates, and the intermediates containing such an additive are themselves characterized by their good stability in storage. It is particularly noteworthy that the reactivity of the moulding materials does virtually not decrease, even if the peroxide is added to the intermediates containing such a polyurethane after prolonged storage.

The unsaturated polyesters comprise, as is usual, condensation products of $\alpha$, $\beta$-unsaturated dicarboxylic acids, optionally in admixture with other customary dicarboxylic acids, and dialcohols; the copolymerizable monomers also comprise the usual compounds, such as styrene and its homologues, e.g. vinyl-toluene and p-chlorostyrene, acrylic and methacrylic acid esters and esters of unsaturated alcohols, e.g. diallyl phthalate.

Diacyl peroxides are, for example, benzoyl, p-chlorobenzoyl, benzoylacetyl, phthalyl and lauroyl peroxides.

The polyurethanes can be added to the moulding material intermediates as such, but preferably dissolved in a copolymerizable monomer, e.g. styrene, in the stated amounts.

The following Examples 4 to 6 illustrate the use of the new polyurethanes as additives to intermediates of polyester moulding materials.

EXAMPLE 4

2.7 Parts by weight of a 70 percent by weight solution of the polyurethane prepared according to Example 1, in styrene, are admixed with 100 parts by weight of a 70 percent by weight solution of a polyester, prepared from 3,210 parts by weight maleic acid anhydride, 5,421 parts by weight phthalic acid anhydride and 5,616 parts by weight 1,2-propylene glycol, in styrene. After the addition of 3 percent by weight of the commercial benzoyl peroxide paste, the polyester moulding mass so produced hardens at 20° C in 7 minutes and 50 seconds. If, however, the intermediate containing the polyurethane is stored at room temperature for 3 weeks, the hardening time is almost unchanged: it amounts to 9 minutes and 10 seconds.

EXAMPLE 5

To 3 parts by weight of a 70 percent by weight solution of the polyurethane prepared according to Example 2, in styrene, there are added 100 parts by weight of the solution of polyester in styrene described in Example 4. When the peroxide paste is added immediately after preparation of the solution, the hardening time at 20° C again amounts to 7 minutes and 50 seconds. If the polyurethane-containing intermediate is first stored for 3 weeks, the hardening time amounts to 8 minutes and 25 seconds.

EXAMPLE 6

To 2.5 parts by weight of a 70 percent by weight solution of the polyurethane prepared according to Example 3, in styrene, there are added 100 parts by weight of the polyester solution in styrene described in Example 4. When the peroxide paste is added immediately after the preparation of the solution, the hardening time amounts to 10 minutes and 25 seconds; if the polyurethane-containing intermediate is first stored for 3 weeks, it amounts to 9 minutes and 50 seconds.

What is claimed is:

1. A solution of an unsaturated polyester of an $\alpha,\beta$-unsaturated dicarboxylic acid and a diol in a liquid copolymerizable monomer containing 0.1 to about 5 percent by weight of a compound produced by the process of reacting
   a. an N-aryl-substituted dialkanolamine of the formula

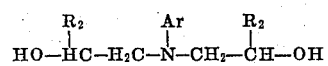

wherein Ar is aryl and $R_2$ is H or $-CH_3$ with
b. a diisocyanate of the formula $$O=C=N-R-N=C=O$$

wherein R is alkylene or arylene and
c. a monoisocyanate of the formula $$R_1-N=C=O$$

or a monoalcohol of the formula $$HO-R_4$$

or a monothioalcohol of the formula $$HS-R_4$$

or a primary or secondary amine of the formula $$HN\begin{matrix}R_5\\R_6\end{matrix}$$

wherein $R_1$ is alkyl, allyl, methoxymethyl or aryl, $R_4$ is alkyl or $$-\overset{R_2}{\underset{}{C}}H-CH_2-\overset{Ar}{\underset{}{N}}-R_1$$

wherein Ar, $R_1$ and $R_2$ are as aforesaid, $R_5$ is H, alkyl or aryl and $R_6$ is alkyl or aryl, the molar ratio of (a):(b):(c) being $n:(n+1):2$ or $(n+1):n:2$ wherein the value of $n$ is from 1 to about 10, at a temperature from about 50° to about 150° C.

2. The solution of claim 1 wherein said copolymerizable monomer is styrene.

3. The solution of claim 1 wherein Ar is phenyl, monochlorophenyl, pentachlorophenyl, toluyl, diphenyl or naphthyl; R is alkylene having up to six carbon atoms, phenylene, toluylene, diphenylene or triisopropylphenylene; $R_1$ is alkyl having up to four carbon atoms, allyl, methoxymethyl, phenyl, pentachlorophenyl or naphthyl; $R_4$ is alkyl having up to four carbon atoms and $R_5$ and $R_6$ are each alkyl having up to four carbon atoms, amyl, phenyl, toluyl or naphthyl.

4. The solution of claim 1 wherein the molar ratio of (a):(b):(c) is from about 2:1:2 to about 6:5:2.

5. The solution of claim 1 wherein the molar ratio of (a):(b):(c) is from about 1:2:2 to about 5:6:2.

* * * * *